United States Patent
Baruschke et al.

[11] Patent Number: 5,826,439
[45] Date of Patent: Oct. 27, 1998

[54] METHOD AND CIRCUIT FOR ON/OFF CONTROL OF THE COMPRESSOR OF A MOTOR VEHICLE AIR CONDITIONER

[75] Inventors: Wilhelm Baruschke, Wangen; Karl Lochmahr, Vailhingen; Markus Speer, Sachsenheim, all of Germany

[73] Assignee: Behr GmbH & Co., Stuttgart, Germany

[21] Appl. No.: 610,406

[22] Filed: Mar. 4, 1996

[30] Foreign Application Priority Data

Mar. 4, 1995 [DE] Germany .................. 195 07 667.2

[51] Int. Cl.⁶ ............................................. F25B 1/00
[52] U.S. Cl. ........................... 62/215; 62/227; 62/208
[58] Field of Search ................... 62/215, 227, 209, 62/208, 150

[56] References Cited

U.S. PATENT DOCUMENTS

| | | | |
|---|---|---|---|
| 3,636,724 | 1/1972 | Moy | 62/215 |
| 3,803,865 | 4/1974 | Newton | 62/227 X |
| 4,412,424 | 11/1983 | Iida et al. | |

FOREIGN PATENT DOCUMENTS

| | | |
|---|---|---|
| 0 396 017 | 11/1990 | European Pat. Off. . |
| 26 37 129 | 2/1978 | Germany . |
| 38 36989 | 5/1990 | Germany . |

*Primary Examiner*—Henry A. Bennett
*Assistant Examiner*—Susanne C. Tinker
*Attorney, Agent, or Firm*—Evenson, McKeown, Edwards & Lenahan, P.L.L.C.

[57] ABSTRACT

A method and circuit are provided for on/off control of the compressor of a motor vehicle air conditioner, in which the compressor is shut off when the evaporator temperature measured by an evaporator temperature sensor drops below a presettable shutoff temperature value located above 0° C. The shutoff temperature value is set to fall as a function of the evaporator blower power and/or the temperature of the air drawn in by the evaporator blower with rising blower power or with rising intake air temperature. The circuit includes a control stage whose output signal is fed to an on/off switching element of the compressor and depends on the voltage level at an input node, which varies with the supply voltage of the evaporator blower and/or the output voltage of the intake air temperature sensor.

23 Claims, 2 Drawing Sheets

METHOD AND CIRCUIT FOR ON/OFF CONTROL OF THE COMPRESSOR OF A MOTOR VEHICLE AIR CONDITIONER

BACKGROUND AND SUMMARY OF THE INVENTION

The invention relates to a method for on/off control of the compressor of a motor vehicle air conditioner in which the compressor is switched off when the evaporator temperature, measured by an evaporator temperature sensor, drops below a presettable shutoff value, and to an electrical circuit suitable for performing this method.

It is known in air conditioners of the above-mentioned type having cyclically operated compressors, that the actual evaporator temperature drops below the preset shutoff value even after the compressor is shut off. This is caused by the inertia of the evaporator temperature sensor which, in turn, depends on the set air volume of the evaporator blower and the intake temperature. In addition, coolant continues to evaporate even after the compressor is shut off until the coolant pressure previously built up by the evaporator has decreased. The risk of icing to the evaporator posed by this effect is conventionally combatted by an icing-protection measure. In the icing protection measure, a shutoff value above 0° C. is permanently set which is sufficiently higher than 0° C., for example approximately 4° C., such that even in the worst case of minimum heat transport in the evaporator, i.e. with a low intake air temperature and minimum evaporator blower activity, evaporator icing is prevented. This procedure takes into account the fact that at higher intake air temperatures and/or higher evaporator blower power values, the cooling power of the air conditioner is not completely utilized because the compressor is shut off earlier than necessary in these situations.

There is therefore needed a method and circuit of the above-mentioned type by which evaporator icing is reliably prevented and a cooling power of the air conditioner is achieved that is as high as possible in all operating situations.

These needs are achieved by a method for on/off control of the compressor of a motor vehicle air conditioner, in which the compressor is shut off when the evaporator temperature measured by an evaporator temperature sensor falls below a presettable shutoff value ($T_{off}$) which is above 0° C.; wherein the shut-off temperature value ($T_{off}$) is set to fall as a function of the evaporator blower power ($U_b$) and/or the temperature ($T_a$) of the air drawn in by the evaporator blower with rising blower power or rising intake air temperature. A circuit for achieving these needs is characterized by a control stage that generates an output signal ($S_{out}$) to control an on/off switching element of the compressor, that depends on the voltage value at an input node which varies with the supply voltage ($U_b$) of an evaporator blower and/or the voltage drop on an intake air temperature sensor for the air drawn in by the evaporator blower. A further circuit is characterized by a microprocessor control, which is set up for performing the method according to the present invention, and for this purpose receives on the input side the measured signal ($M_v$) of an evaporator temperature sensor, the measured signal ($M_a$) of an intake air temperature sensor, and the supply voltage signal ($U_b$) of an evaporator blower. From these signals, using a stored characteristic map for the shutoff temperature value as a function of the evaporator blower voltage and/or the intake air temperature, the microprocessor control generates a control signal ($S_c$) to control an on/off switching element in the compressor.

The shutoff value is set to fall as a function of the evaporator blower power and/or the intake air temperature with rising blower power or rising intake air temperature, but in all cases above 0° C. In this manner, reliable icing protection can be maintained in every operating situation and a higher cooling power is achieved at a higher evaporator blower power and/or a higher intake air temperature, than in the above-mentioned conventional procedure with a fixed shutoff temperature value, since in these cases the compressor is not shut off until later, in other words at lower shutoff values. The electrical circuit makes it possible for a simple circuit to perform this on/off control for the compressor that is adapted to the evaporator blower power and/or the intake air temperature. The further circuit, by virtue of a software conversion, permits on/off control of the compressor as a function of any presettable characteristic maps of the shutoff temperature value as a function of the evaporator blower power and/or the intake air temperature.

In one advantageous embodiment of the method, the shutoff temperature value is set between approximately 3.5° C. and 4.0° C., steadily falling to a minimum value between approximately 0.5° C. and 1° C.

According to a further improvement on the invention, an advantageous on/off hysteresis is created. The hysteresis interval reliably protects against too-frequent compressor switching processes of the icing protection regulation system.

In a yet further improvement on the invention, the shutoff temperature value is set in the form of a characteristic map that depends on both the evaporator blower power and the intake air temperature, in such fashion that it steadily falls to a constant minimum value as a function of each of the two parameters.

By virtue of a preferred design of the circuit, compressor shutoff takes place as a function of both the evaporator blower power and the intake air temperature in accordance with the method.

The circuit design requires both only a minimal slight circuit expense and offers an adaptability to be able to adjust the on/off control to the voltage signal from the evaporator blower and/or the intake air temperature sensor.

Other objects, advantages and novel features of the present invention will become apparent from the following detailed description of the invention when considered in conjunction with the accompanying drawings.

DETAILED DESCRIPTION OF THE DRAWINGS

Figure 1:
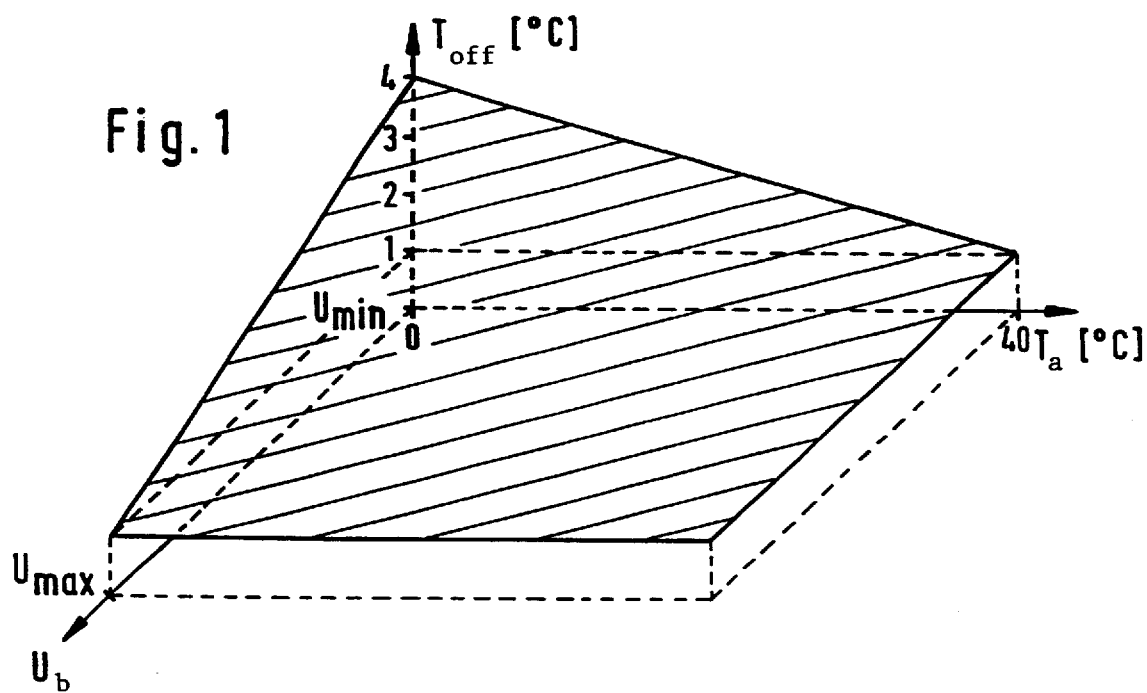
FIG. 1 is a graphic representation of a preset characteristic map for the evaporator temperature shutoff value for switching off a compressor in a motor vehicle air conditioner.

FIG. 1 shows a preset characteristic map for the temperature of an evaporator of a motor vehicle air conditioner, in which the associated compressor in the air conditioner is switched off when an evaporator temperature sensor detects that a value has been undershot. As soon as the evaporator temperature detected by the evaporator temperature sensor exceeds a turn-on temperature, which is set at approximately 0.5° C. above the shutoff temperature ($T_{off}$) determined by the characteristic map, the compressor will be turned on again. The turn-on temperature, which is approximately 0.5° C. higher than the hysteresis interval, results in a desired turn-on hysteresis of the compressor which is operated on this cycle to prevent disadvantageously frequent compressor switching or "short cycling".

The characteristic map gives the shutoff temperature ($T_{off}$) as a function of the blower voltage ($U_b$) which determines the evaporator blower power and as a function of the temperature ($T_a$) of the air drawn in by the evaporator blower, which corresponds essentially to the outside temperature during free air operation. As shown in FIG. 1, the shutoff temperature ($T_{off}$) at minimum blower voltage ($U_{min}$) and minimum intake air temperature (($T_a$)≈0° C.) assumes its maximum value of 4° C. The shutoff temperature ($T_{off}$) assumes its minimum value of 1° C. at maximum blower voltage ($U_{max}$) regardless of the intake air temperature ($T_a$) and at an intake air temperature ($T_a$) of 40° C. independently of the blower voltage ($U_b$). Between these corner values the characteristic map for the shutoff temperature ($T_{off}$), with a fixed first value, is linear as a function of the other value. The maximum value of 4° C. ensures that even in the worst case of minimum blower power ($U_b$) and minimum intake air temperature ($T_a$), the actual evaporator temperature does not drop to 0° C. This is because of the inertia of the evaporator temperature sensor and the cooling power of the air conditioner that does not cease abruptly when the compressor is shut off because of the initially gradually decreasing coolant pressure on the high pressure side. Icing of the evaporator is thus reliably prevented. At the same time the set characteristic map permits a lower shutoff temperature ($T_{off}$) and thus a longer active cooling operation of the air conditioner at higher evaporator blower power ($U_b$) and also at higher intake air temperature ($T_a$). This is because in these two cases more heat is fed to the evaporator that prevents its icing. In this manner in these operating states, the cooling power of the air conditioner is better utilized than when a fixed shutoff temperature value of about 4° C. is set.

Of course it is possible with an evaporator blower having a blower power which can be adjusted in stages instead of the continuous characteristic map shown in FIG. 1, to assign each blower stage a discrete shutoff temperature value ($T_{off}$) possibly once again in additional dependence on the intake air temperature ($T_a$). In a simplified method for on/off control of the compressor, provision can be made such that the shutoff temperature $T_{off}$, instead of the two-dimensional characteristic map in FIG. 1, can be set to vary only as a function of the evaporator blower power ($U_b$) or only as a function of the intake air temperature ($T_a$)

Figure 2:
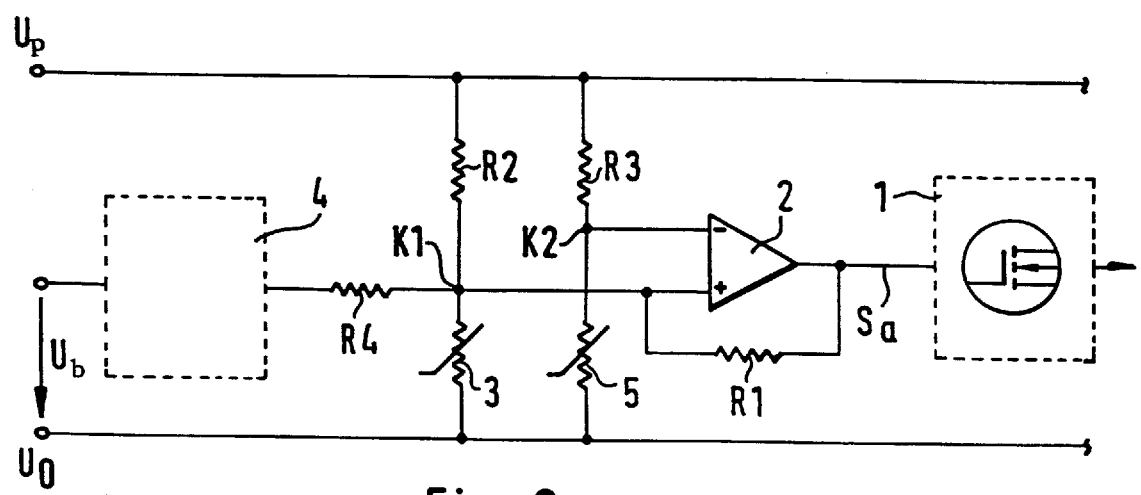
FIG. 2 is a schematic diagram of a discrete electrical circuit for on/off control of the compressor.

FIG. 2 shows the schematic diagram of a discrete electrical circuit with which the above-described on/off control method for the air conditioner compressor can be operated in a manner that permits a simple circuit. The circuit includes a semiconductor power switch (1) (shown schematically) which connects in the direction of the arrow to a compressor coupling, and can switch the compressor on and off. Power switch (1) is controlled by a control stage which incorporates an operational amplifier (2) and a resistor ($R_1$), through which the output signal ($S_{out}$) of the operational amplifier (2) is co-coupled to its non-inverting input. On the input side of the operating amplifier (2), two voltage dividers are connected in parallel between a ground potential ($U_0$) and a positive on-board voltage potential ($U_p$) of the motor vehicle electrical system. The first voltage divider includes a fixed resistance ($R_2$) and an intake air temperature sensor (3), that includes an electrical resistance that depends on the temperature of the air drawn in by the evaporator blower. The middle tap ($K_1$) of this voltage divider constitutes an input node to which the non-inverting operational amplifier input is connected. The second voltage divider consists of a fixed resistance ($R_3$) and an evaporator temperature sensor (5), with the inverting operational amplifier input connected to the middle tap ($K_2$) of this voltage divider. The voltage ($U_b$) of the evaporator blower is coupled through a filter and protective circuit (4) as well as the value resistance ($R_4$) to the middle tap of the first voltage divider.

Obviously this circuit delivers the on/off control for the compressor that is required and depends on the evaporator blower power ($U_b$) and the intake air temperature ($T_a$). As soon as the evaporator blower voltage, and hence the evaporator blower power as well, decrease, the potential on middle tap ($K_1$) of the first voltage divider and hence at the non-inverting operational amplifier input, is reduced. This leads to an adjustment of a higher shutoff temperature ($T_{off}$) that is, desired according to FIG. 1. In the same manner, the potential at middle tap ($K_1$) of the first voltage divider decreases when the intake air temperature ($T_a$) decreases and hence with a lower electrical resistance of the intake air temperature sensor (3), which likewise results in the desired higher shutoff temperature ($T_{off}$) being obtained.

In a simplified version of the circuit, instead of intake air temperature sensor (3), a fixed resistance can be provided that creates a circuit in which shutoff temperature ($T_{off}$) for the compressor is set only as a function of the evaporator blower voltage ($U_b$), i.e. the evaporator blower power, specifically in accordance with the line of the characteristic map of FIG. 1 intersecting the vertical plane at minimum intake air temperature ($T_a$≈0° C.). Of course, the circuit in FIG. 2 can be modified if necessary in such fashion that the shutoff temperature ($T_{off}$) is set to vary only as a function of intake air temperature ($T_a$), while the branch of the circuit through which the blower voltage ($U_b$) is conducted to middle tap ($K_1$) of the first voltage divider, is omitted. It is understood that the individual skilled in the art would be able to dimension the circuit depending on his requirements in such fashion that it would deliver the shutoff temperatures ($T_{off}$) corresponding to the desired characteristic map, with the characteristic map in FIG. 1 being considered only as an example and being capable of being modified in position and form in a manner specific to an individual application.

Figure 3:
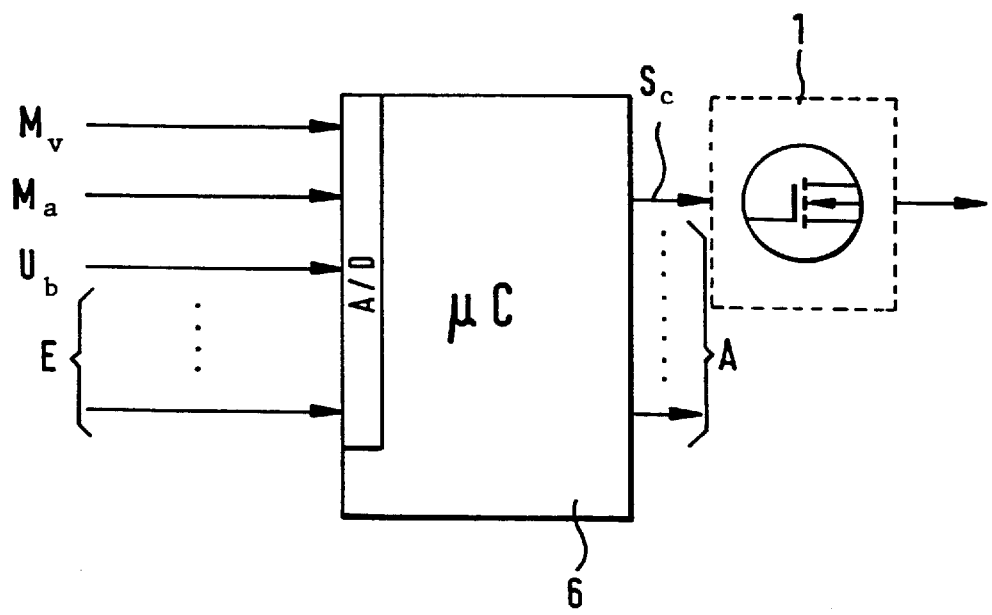
FIG. 3 is a block diagram of a circuit version in which on/off control is performed in accordance with a characteristic map of the type shown in FIG. 1 through the use of a microprocessor.

FIG. 3 shows an integrated circuit version with a microprocessor (6), with which the on/off control method described above for the air conditioner compressor can be worked without additional discrete circuit expense. All necessary input and output signals are also available in a conventional control. On the input side, the microprocessor (6) receives the measurement signals ($M_v$, $M_a$) from the evaporator temperature sensor and the intake air temperature sensor, the evaporator blower voltage ($U_b$), and possibly other input signals (E). As a function of the stored characteristic map, microprocessor (6) then produces a control signal ($S_c$) for a semiconductor power switch (1) analogous to the one in FIG. 1. With additional output signals (A), it can perform other functions which are of no further interest here. The characteristic map of the type in FIG. 1 is stored purely by software in microprocessor (6) and offers all degrees of freedom in the special design of which the characteristic map shown as a plane surface in FIG. 1 is only one possible simple example of any of the characteristic map forms that can be stored. In addition, the switch-on-again temperature can be made variable in accordance with the characteristic map for the shutoff temperature ($T_{off}$), with the switch-on hysteresis for a high blower voltage ($U_b$) and/or high intake air temperature ($T_a$) being made smaller than for a low blower voltage ($U_b$) and/or low intake air temperature ($T_a$).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for on/off control of a compressor of a motor vehicle air conditioner over a whole temperature range, the method comprising the steps of:

shutting-off the compressor when an evaporator temperature measured by an evaporator temperature sensor falls below a presettable shut-off value ($T_{off}$) which is above 0° C.; and setting the presettable shut-off value ($T_{off}$) to fall as a continuously differentiable function of at least one of an evaporator blower power ($U_b$) and a temperature ($T_a$) of air drawn in by an evaporator blower in the whole temperature range with rising blower power or rising air intake temperature.

2. The method according to claim 1, wherein the step of setting the presettable shut-off value ($T_{off}$) further comprises the step of setting the presettable shut-off value to fall from a maximum value of approximately 3.5° C. to 4° C. with minimum blower power or air intake temperature to a minimum value of approximately 0.5° C. to 1° C. with maximum blower power or air intake temperature.

3. The method according to claim 2, further comprising the step of always again turning-on the compressor when the evaporator temperature measured by the evaporator temperature sensor exceeds a turn-on temperature value which is preset by a constant turn-on hysteresis value or one that decreases with at least one of higher blower power ($U_b$) and higher air intake temperature ($T_a$), so as to lie above the shut-off temperature value ($T_{off}$).

4. The method according to claim 1, further comprising the step of always again turning-on the compressor when the evaporator temperature measured by the evaporator temperature sensor exceeds a turn-on temperature value which is preset by a constant turn-on hysteresis value or one that decreases with at least one of higher blower power ($U_b$) and higher air intake temperature ($T_a$) so as to lie above the shut-off temperature value ($T_{off}$).

5. The method according to claim 1, further comprising the step of always again turning-on the compressor when the evaporator temperature measured by the evaporator temperature sensor exceeds a turn-on temperature value which is preset by a turn-on hysteresis value that decreases with at least one of higher blower power ($U_b$) and higher air intake temperature ($T_a$), so as to lie above the shut-off temperature value ($T_{off}$).

6. A method for on/off control of a compressor of a motor vehicle air conditioner, the method comprising the steps of:

shutting-off the compressor when an evaporator temperature measured by an evaporator temperature sensor falls below a presettable shut-off value ($T_{off}$) which is above 0° C.; and setting the presettable shut-off value ($T_{off}$) to fall as a function of at least one of an evaporator blower power ($U_b$) and a temperature ($T_a$) of air drawn in by an evaporator blower with rising blower power or rising air intake temperature; and wherein the shut-off temperature value ($T_{off}$) is preset in a characteristic map form that depends on the blower power ($U_b$) and the air intake temperature ($T_a$) said shut-off temperature value falling linearly as a function of one value while another value remains constant and, at maximum blower power and at an air intake temperature above a limiting value, assumes a constant minimum value.

7. A method for on/off control of a compressor of a motor vehicle air conditioner, the method comprising the steps of:

shutting-off the compressor when an evaporator temperature measured by an evaporator temperature sensor falls below a presettable shut-off value ($T_{off}$) which is above 0° C.; and setting the presettable shut-off value ($T_{off}$) to fall as a function of at least one of an evaporator blower power ($U_b$) and a temperature ($T_a$) of air drawn in by an evaporator blower with rising blower power or rising air intake temperature;

wherein the step of setting the presettable shut-off value ($T_{off}$) further comprises the step of setting the presettable shut-off value to fall from a maximum value of approximately 3.5° C. to 4° C. with minimum blower power or air intake temperature to a minimum value of approximately 0.5° C. to 1° C. with maximum blower sower or air intake temperature; and wherein the shut-off temperature value ($T_{off}$) is preset in a characteristic map form that depends on the blower power ($U_b$) and the air intake temperature ($T_a$), said shut-off temperature value falling linearly as a function of one value while another value remains constant and, at maximum blower power and at an air intake temperature above a limiting value, assumes a constant minimum value.

8. A method for on/off control of a compressor of a motor vehicle air conditioner, the method comprising the steps of:

shutting-off the compressor when an evaporator temperature measured by an evaporator temperature sensor falls below a presettable shut-off value ($T_{off}$) which is above 0° C.; and setting the presettable shut-off value ($T_{off}$) to fall as a function of at least one of an evaporator blower power ($U_b$) and a temperature ($T_a$) of air drawn in by an evaporator blower with rising blower power or rising air intake temperature;

further comprising the step of always again turning-on the compressor when the evaporator temperature measured by the evaporator temperature sensor exceeds a turn-on temperature value which is preset by a constant turn-on hysteresis value or one that decreases with at least one of higher blower power ($U_b$) and higher air intake temperature ($T_a$), so as to lie above the shut-off temperature value ($T_{off}$); and wherein the shut-off temperature value ($T_{off}$) is preset in a characteristic map form that depends on the blower power ($U_b$) and the air intake temperature ($T_a$), said shut-off temperature value falling linearly as a function of one value while another value remains constant and, at maximum blower power and at an air intake temperature above a limiting value, assumes a constant minimum value.

9. A circuit for on/off control of a compressor of a motor vehicle air conditioner over a whole temperature range, comprising;

an on/off switching element for the compressor;

a control stage comprising an operational amplifier which generates an output signal ($S_{out}$) to directly control the on/off switching element, said output signal depending on a voltage value at an input node for the operational amplifier which varies in a continuously differentiable manner with at least one of a supply voltage ($U_b$) of an evaporator blower and a voltage drop on an air intake temperature sensor for air drawn in by the evaporator blower.

10. The circuit according to claim 9, wherein the supply voltage ($U_b$) of the evaporator blower through a resistor and the voltage drop on the air intake temperature sensor are coupled in parallel to the input node.

11. The circuit according to claim 9, wherein the control stage comprises an operational amplifier having a non-inverting input connected with a middle tap of a voltage divider between voltage supply potentials ($U_b$, $U_0$), in one part of said voltage divider, at least one of the supply voltage ($U_b$) of the evaporator blower through the resistor and an output voltage of an air intake temperature sensor is applied while an inverting input of the operational amplifier is connected with a further middle tap of a further voltage divider comprising a further resistor and a further evaporator temperature sensor arranged between the voltage supply potentials.

12. A circuit for on/off control of a compressor of a motor vehicle air conditioner, comprising:
a microprocessor programmed to carry out the steps of shutting-off the compressor when an evaporator temperature measured by an evaporator temperature sensor falls below a presettable shut-off value ($T_{off}$) which is above 0° C.;
wherein said microprocessor receives as inputs a measured signal ($M_v$) of an evaporator temperature sensor, a second measured signal ($M_a$) of an air intake temperature sensor, and a supply voltage signal ($U_b$) of an evaporator blower; and
wherein from the input signals, said microprocessor uses a stored characteristic map for a shut-off temperature value as a function of at least one of an evaporator blower voltage and an air intake temperature, for generating a control signal ($S_c$) for controlling an on/off switching element in the compressor.

13. A method for on/off control of a compressor of a motor vehicle air conditioner, the method comprising the steps of:
shutting-off the compressor when an evaporator temperature measured by an evaporator temperature sensor falls below a presettable shut-off value ($T_{off}$) which is above 0° C.; and
setting the presettable shut-off value ($T_{off}$) to fall as a function of an evaporator blower power ($U_b$) with rising blower power.

14. The method according to claim 13, wherein the step of setting the presettable shut-off value ($T_{off}$) further comprises the step of setting the presettable shut-off value to fall from a maximum value of approximately 3.5° C. to 4° C. with minimum blower power to a minimum value of approximately 0.5° C. to 1° C. with maximum blower power.

15. The method according to claim 14, further comprising the step of always again turning-on the compressor when the evaporator temperature measured by the evaporator temperature sensor exceeds a turn-on temperature value which is preset by a constant turn-on hysteresis value or one that decreases with higher blower power ($U_b$), so as to lie above the shut-off temperature value ($T_{off}$).

16. The method according to claim 14, wherein the shut-off temperature value ($T_{off}$) is preset in a characteristic map form that depends on the blower power ($U_b$) and an air intake temperature ($T_a$), said shut-off temperature value falling linearly as a function of one value while another value remains constant and, at maximum blower power and at an air intake temperature above a limiting value, assumes a constant minimum value.

17. The method according to claim 13, further comprising the step of always again turning-on the compressor when the evaporator temperature measured by the evaporator temperature sensor exceeds a turn-on temperature value which is preset by a constant turn-on hysteresis value or one that decreases with higher blower power ($U_b$), so as to lie above the shut-off temperature value ($T_{off}$).

18. The method according to claim 17, wherein the shut-off temperature value ($T_{off}$) is preset in a characteristic map form that depends on the blower power ($U_b$) and an air intake temperature ($T_a$), said shut-off temperature value falling linearly as a function of one value while another value remains constant and, at maximum blower power and at an air intake temperature above a limiting value, assumes a constant minimum value.

19. The method according to claim 13, wherein the shut-off temperature value ($T_{off}$) is preset in a characteristic map form that depends on the blower power ($U_b$) and an air intake temperature ($T_a$), said shut-off temperature value falling linearly as a function of one value while another value remains constant and, at maximum blower power and at an air intake temperature above a limiting value, assumes a constant minimum value.

20. A circuit for on/off control of a compressor of a motor vehicle air conditioner, comprising;
an on/off switching element for the compressor;
a control stage which generates an output signal ($S_{out}$) to control the on/off switching element, said output signal depending on a voltage value at an input node for the control stage which varies with a supply voltage ($U_b$) of an evaporator blower.

21. The circuit according to claim 20, wherein the supply voltage ($U_b$) of the evaporator blower through a resistor is coupled into the input node.

22. The circuit according to claim 20, wherein the control stage comprises an operational amplifier having a non-inverting input connected with a middle tap of a voltage divider between voltage supply potentials ($U_b$, $U_0$), in one part of said voltage divider the supply voltage ($U_b$) of the evaporator blower is applied through the resistor while an inverting input of the operational amplifier is connected with a further middle tap of a further voltage divider comprising a further resistor and a further evaporator temperature sensor arranged between the voltage supply potentials.

23. A circuit for on/off control of a compressor of a motor vehicle air conditioner, comprising:
a microprocessor programmed to carry out the steps of shutting-off the compressor when an evaporator temperature measured by an evaporator temperature sensor falls below a presettable shut-off value ($T_{off}$) which is above 0° C.;
wherein said microprocessor receives as inputs a measured signal ($M_v$) of an evaporator temperature sensor and a supply voltage signal ($U_b$) of an evaporator blower; and
wherein from the input signals, said microprocessor uses a stored characteristic map for a shut-off temperature value as a function of an evaporator blower voltage for generating a control signal ($S_c$) for controlling an on/off switching element in the compressor.

* * * * *